Patented Jan. 21, 1936

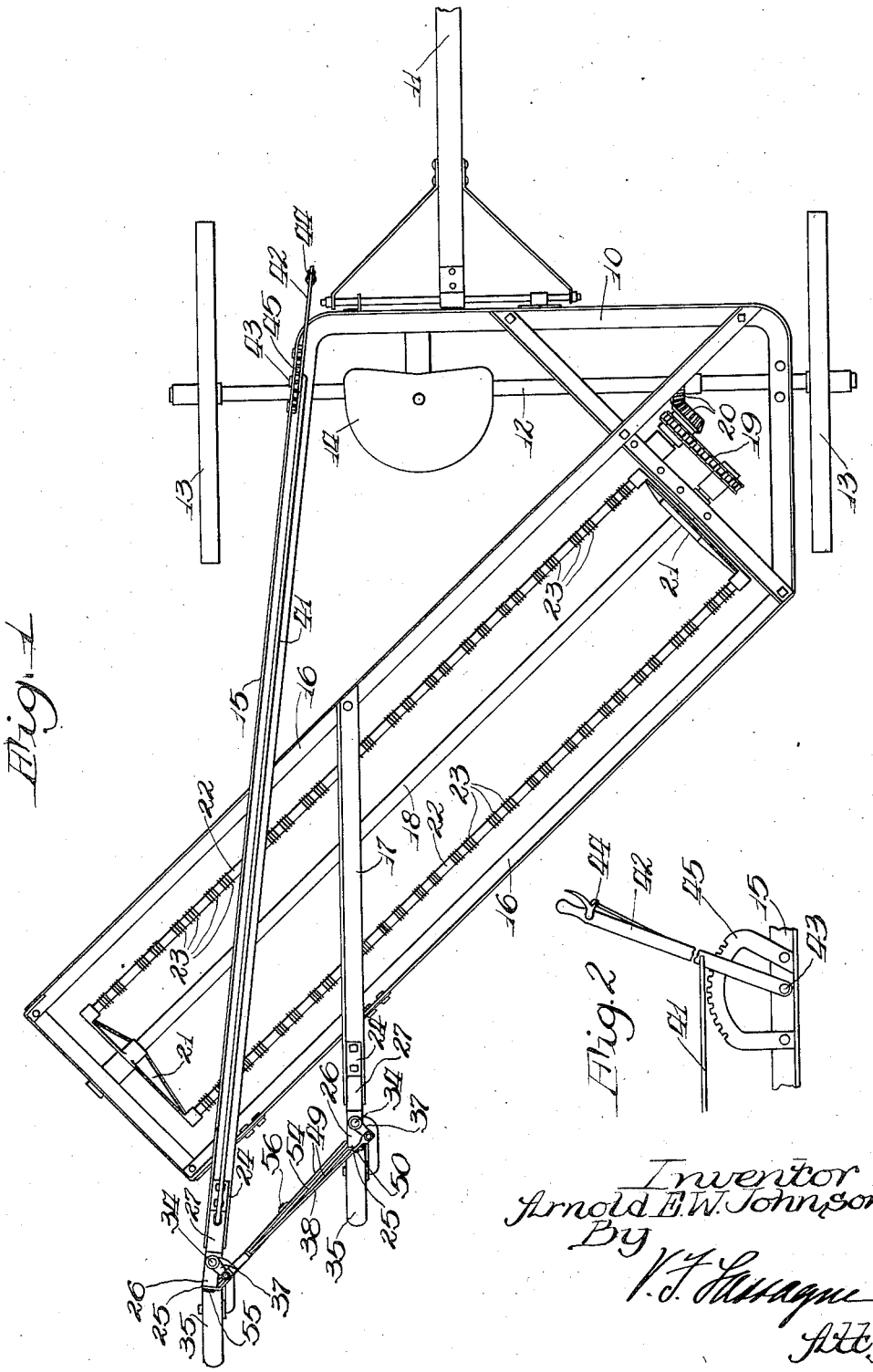

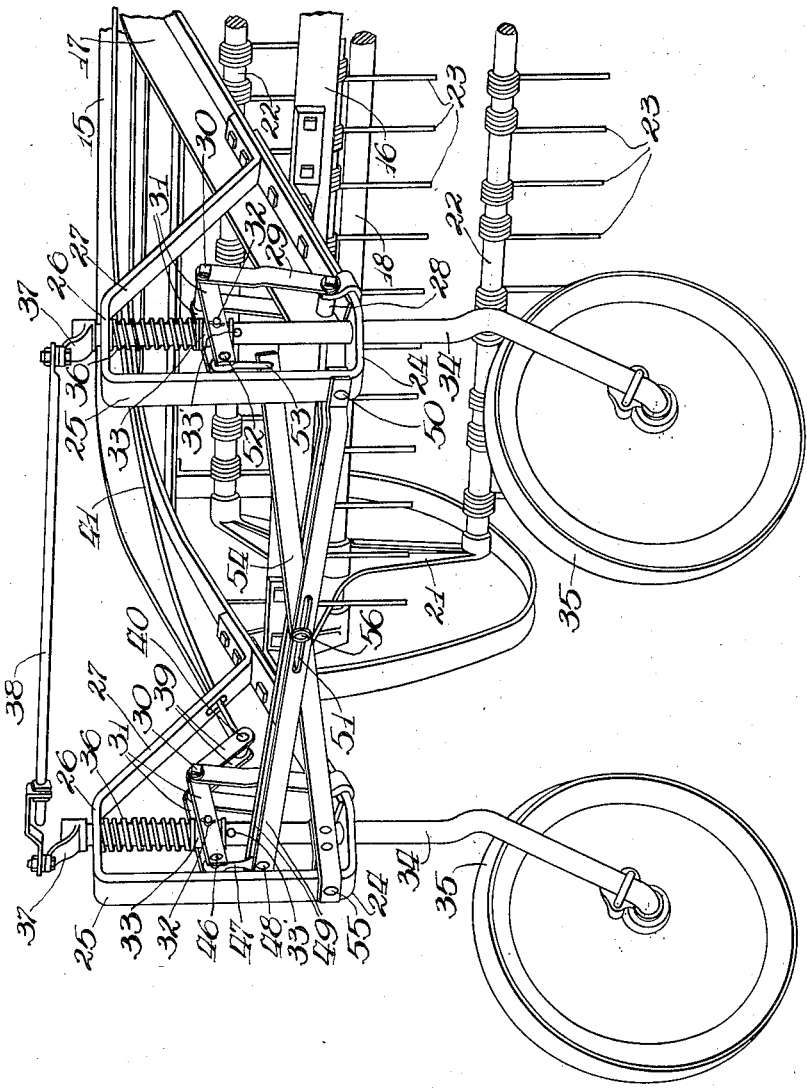

2,028,332

UNITED STATES PATENT OFFICE 2,028,332

SIDE DELIVERY RAKE

Arnold E. W. Johnson, Chicago, Ill., assignor to International Harvester Company, a corporation of New Jersey Application February 4, 1935, Serial No. 4,780

9 Claims. (Cl. 56—377)

The invention relates to side delivery rakes of the type having a diagonally disposed raking cylinder carried by a main frame which main frame at its front end is carried by two transversely disposed wheels. It is common practice to provide two diagonally spaced rear trailing caster wheels for carrying the rear end of the frame structure, the purpose of these rear caster wheels being to facilitate the draft of the implement and to make it easier to travel over rough ground.

More particularly, the present invention relates to a simplified mechanism for adjusting the height of the main frame so that the raking cylinder may have its position adjusted up or down with respect to the ground. It is desirable that such adjustment be manually controlled, with the force used in effecting the adjustment applied to the frame at the spindle for one of the caster wheels with mechanism connecting the frame at the spindle for the other caster wheel, so that both points of the main frame will be simultaneously adjusted.

The object of the invention is generally to improve such adjustment mechanism for side delivery rakes. Another object is to provide a simple form of mechanical linkage between the two trailing caster wheels and the main frame at said caster wheels for simultaneously adjusting the frame at these points.

Other objects of the invention will be apparent to those skilled in this art as the disclosure is more fully made.

Briefly, these objects are achieved in a side delivery rake having a frame, two rear points thereof being mounted for adjustment on the upstanding spindles of two offset trailing caster wheels. The frame structure carries, adjacent the spindle wheels, a simple lever and bell-crank mechanism, so that the two points of the frame are tied together for conjoint up and down movement of the frame on the spindles when a raising or lowering force is applied to the bell crank associated with one of the spindles.

The drawings accompanying this disclosure illustrate a practicable embodiment of the invention, and in these drawings:

Figure 1 is a general plan view of a conventional type of side delivery hay rake embodying the improvements of this invention;

Figure 2 is a side elevational detail view of the hand lever control mechanism for operating the improved adjusting means;

Figure 3 is a perspective elevational view, on an enlarged scale, of the rear end of the rake, showing the two caster wheels and the adjusting linkage carried by the frame and associated with the spindles for said caster wheels; and, Figure 4 is a detail sectional view through one of the spindles to show a collar thereon with an associated bell crank lever.

The rake shown embodies a main frame 10 having a draw element 11 connected to the front end thereof, said frame being supported on a transverse axle 12 carried in a pair of transversely disposed wheels 13. An operator's seat is shown at 14. The main frame includes a rearwardly and diagonally extending angle bar 15 at one side and to which is connected in the usual way the diagonally disposed rake cylinder carrying frame 16, which at its front end is secured to the main frame 10, as shown in Figure 1. Spaced from the angle bar frame member 15, the frame members 16 carry a rearwardly extending angle bar frame piece 17, both of the angle bars 15 and 17 being disposed over and extending some distance rearwardly of the frame 16.

The frame 16, in the conventional manner, carries a rake shaft 18 driven from a sprocket chain 19 and gears 20 operated from the rotation of the axle 12, said shaft 18 carrying the usual end members 21, which, in turn, carry rake bars 22, on which are mounted the depending raking teeth 23.

Each angle bar 15 and 17, as shown best in Figure 3, has bolted to the horizontal web portion thereof at the rear end of the said bars, a bracket member 24. Each bracket member 24 includes an upstanding portion 25, a horizontal upper portion 26, and a forwardly and downwardly extending portion 27, which, in turn, is bolted to the respective bars 15 and 17. The rear end of each bar 15, 17 carries a pin 28 for pivotally mounting a pair of spaced upstanding levers 29, which, in turn, carry a pin 30 at their upper ends. Pivotally connected with each pin 30 is a pair of spaced horizontal arms 31, which, as shown in Figure 4, are pivoted to pins 32 extending from opposite sides of a collar 33.

There are two such collars 33, as shown, carried on spindles 34 by pins 33' and, passed through each collar, is the vertically extended spindle 34 of a pair of spaced offset trailing caster wheels 35. The collars 33 are loosely turnable on the respective spindles 34, and, between the upper edge of each collar 33 and the vertical run 26 of each bracket 24, is a coil spring 36 encircling the spindle. These coil springs counterbalance the weight of the main frame and raking cylinder on the collars 33 and pins 33'.

The upper end of each spindle 34 carries a crank arm 37, said two crank arms 37 being connected by an adjustable tie-rod 38, said tie-rod causing both caster wheels 35 at all times to angle together.

The levers 31 disposed on the left hand spindle 34, as viewed in Figure 3, include a pair of extensions 39, so that the levers 31 and 39 in effect form a double bell crank lever carrying a pin 40, to which is connected a flexible push-pull rod 41, which extends forwardly alongside the angle bar 15 to a point adjacent the driver's seat 14, where it is connected with a hand lever 42 pivoted at 43 to the frame piece 15. Associated with this lever is the conventional form of detent lock 44 cooperable with a toothed quadrant 45, whereby the lever 42 may be held in any adjusted position.

The rear end of the pair of levers 31 on the left hand spindle 34 carries a pin 46, from which pin is pivotally and pendently hung a link 47, that has pivotal connection at 48 with a pair of spaced levers 49, the opposite end of said spaced levers being pivotally connected at 50 to the upstanding portion 25 of the opposite bracket 24. Intermediately of their ends the double levers 49 are provided with an elongated slot 51.

The levers 31 on the right handle spindle 34 carry a hinge pin 52, from which is pendently hung a link 53, which pivotally carries a lever 54 connected at its opposite end by a pivot 55 to the upstanding portion 25 of the opposite bracket 24. Intermediately of its ends, the lever 54 carries a pin 56, which is passed through the slot 51 in the crossed lever 49. It will be noted that the single lever 54 passes between the double lever 49 and that the two levers constitute a cross lever arrangement.

In use, it becomes necessary at times to raise the raking cylinder and its bars 22, or to lower them for the purpose of changing the position of the raking teeth 23 with respect to the ground. In operation, when it is desired to raise the rake cylinder, the operator pulls the lever 42 and rod 41 forwardly, thereby rocking the lever arm 31, as seen in Figure 3, about its fulcrum 32 by means of the bell crank arm 39. Thus, the front end of the lever arm 31 moves upwardly to raise the frame 15 through the left hand arms 29, it being remembered that the collar 33 is held on the pin 33'. At the same time, the rear end of the left hand levers 31 swing downwardly to drop the left hand end of the cross lever 49 about its fulcrum 56, thereby lowering the right hand end of the lever 54 to pull down the right hand link 53, thereby lowering the rear end of the double lever 31 on the right hand fulcrum 32, and, as a consequence, raising the front end of said lever 31 to pull upwardly on the right hand arms 29 to raise the frame piece 17. Thus, both points of the frame at 15 and 17 are simultaneously raised about the fulcrums 32 on the two collars 33 carried, respectively, by the two spindles 34. By locking the detent associated with the lever 42, the frame can be maintained in its raised position.

In lowering the frame at the two points adjacent the two spindles 34, the lever 42 is moved rearwardly, whereby the front end of the left hand lever 31 moves down about the fulcrum 32 and the rear end thereof moves up. Thus, through link 47 the left hand end of the lever 49 moves up to carry the rear end of the right hand lever 31 up and the front end thereof down. As a result, both the left hand arms 29 and the right hand arms 29 are thrust downwardly to push the two frame parts 15 and 17 downwardly to lower the frame.

From this detailed description, it can now be appreciated that a simple cross linkage is provided between the two caster wheel spindles 34 to simultaneously move the frame, at the two points, up or down with the lifting or lowering force being applied directly to only one of the points.

It is the intention to cover all changes and modifications not departing from the spirit and scope of the invention as indicated by the appended claims.

What is claimed is:

1. A side delivery hay rake having a frame carried at its rear end on a pair of offset spaced ground engaging supports including upright spindles, a collar mounted on each spindle, a lever fulcrumed on each collar, connections between each lever and a point on the frame adjacent each spindle, means to rock one of the levers to transmit a lifting or lowering force to a point on the frame adjacent one spindle, and linkage for transmitting the same motion to the lever and connections associated with the other spindle to move the other point of the frame conjointly.

2. A side delivery hay rake having a frame carried at its rear end on a pair of offset spaced ground engaging caster wheel supports including upright spindles, a collar mounted on each spindle, a pivoted member associated with each collar, said pivoted members having connection with the frame, means to pivot one of the levers to transmit a lifting or lowering force to a point on the frame adjacent one spindle, and means for connecting the two pivoted members whereby the said force is applied also to the other pivoted member to move it and the adjacent point of the frame in the same direction.

3. A side delivery hay rake having a frame carried at its rear end on a pair of offset spaced ground engaging caster wheel supports including upright spindles, a collar mounted on each spindle, a rockable means associated with each collar, said rockable means each having connection with an adjacent point of the frame, means to rock one of the rockable means to transmit a lifting or lowering force to the adjacent point on the frame to adjust the frame on the adjacent spindle, and lever mechanism for cross connecting the two rockable means whereby the said force is applied also to the other rockable means to move it and the adjacent point of the frame in the same direction.

4. A side delivery hay rake having a frame carried at its rear end on a pair of offset spaced ground engaging caster wheel supports including upright spindles, a collar mounted on each spindle, a lever pivoted on each collar and each lever having connection with an adjacent point of the frame, one of said levers including a bell crank arm, means to actuate the arm to pivot the associated lever to apply a lifting or lowering force to the adjacent point of the frame, and means connecting the two levers together for conjoint movement to apply the lifting or lowering force in the same direction to the other point on the frame.

5. A side delivery hay rake having a frame carried at its rear end on a pair of offset spaced ground engaging caster wheel supports including upright spindles, a collar mounted on each spindle, a lever pivoted on each collar and each lever having connection with an adjacent point of the frame, one of said levers including a bell crank arm, means to actuate the arm to pivot the associated lever to apply a lifting or lowering force to the adjacent point of the frame, and means comprising crossed links connected between the levers and the two points of the frame for causing conjoint movement of the levers when the bell crank arm is operated to apply the lifting or lowering force in the same direction to the other point on the frame.

6. A side delivery hay rake having a frame carried at its rear end on a pair of offset spaced ground engaging caster wheel supports including upright spindles, a collar mounted on each spindle, a lever pivoted on each collar and each lever having connection with an adjacent point of the frame, one of said levers including a bell crank arm, means to actuate the arm to pivot the associated lever to apply a lifting or lowering force to the adjacent point of the frame, crossed links connected between the levers and the two points of the frame, and a pivot connecting said links intermediate their ends whereby when the bell crank arm is moved to operate one lever the other lever moves conjointly therewith to apply the lifting or lowering force in the same direction to the other point on the frame.

7. A side delivery hay rake having a frame carried at its rear end on a pair of offset spaced ground engaging caster wheel supports including upright spindles, a collar mounted on each spindle, a lever pivoted on each collar and each lever having connection with an adjacent point of the frame, one of said levers including a bell crank arm, means to actuate the arm to pivot the associated lever to apply a lifting or lowering force to the adjacent point of the frame, crossed links connected between the levers and the two points of the frame, and a sliding pivot connecting the links substantially midway between their ends where they cross, whereby when the bell crank arm is moved to operate one lever the other lever moves conjointly therewith to apply the lifting or lowering force in the same direction to the other point on the frame.

8. The combination with a diagonally arranged frame and a wheeled support at its forward end, of a pair of spaced ground engaging supports at the rear of the frame, said frame and ground engaging supports being vertically adjustable relative to each other, a lever, rockable means associated with one support and the frame and having connection with the lever to adjust the frame at the one support, similar rockable means associated with the other support and the frame, and lever connections between both rockable means to adjust both points of the frame simultaneously relative to both supports when the lever is operated.

9. The combination with a diagonally arranged frame and a wheeled support at its forward end, of a pair of spaced ground engaging supports at the rear of the frame, said frame and ground engaging supports being vertically adjustable relative to each other, a lever, rockable means associated with one support and the frame and having connection with the lever to adjust the frame at the one support, similar rockable means associated with the other support and the frame, and crossed link connections between both rockable means and two points on the frame to adjust both points of the frame simultaneously relative to both supports when the lever is operated.

ARNOLD E. W. JOHNSON.